Figure 1:
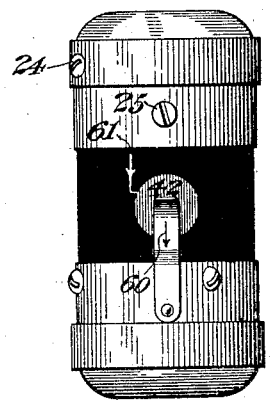

M. R. HUTCHISON.
ELECTRICAL SWITCHING AND TESTING DEVICE.
APPLICATION FILED OCT. 21, 1905.

1,048,172.

Patented Dec. 24, 1912.

Witnesses
Chas. F. Clagett
Lillian F. King

Miller Reese Hutchison Inventor.
By his Attorney
G. C. Dean

UNITED STATES PATENT OFFICE.

MILLER REESE HUTCHISON, OF BRONXVILLE, NEW YORK.

ELECTRICAL SWITCHING AND TESTING DEVICE.

1,048,172.   Specification of Letters Patent.   Patented Dec. 24, 1912.

Application filed October 21, 1905. Serial No. 283,719.

*To all whom it may concern:*

Be it known that I, MILLER REESE HUTCHISON, citizen of the United States, and resident of Bronxville, in the county of Westchester and State of New York, have invented certain new and useful Improvements Relating to Electrical Switching and Testing Devices, of which the following is a specification.

This invention relates to an electrical switch and means for testing polarity of current flow, the two being combined in a single structure whereby the current may be turned on and off or reversed at will, and the polarity of the connection readily and accurately determined, either prior to or after connection of the leads to the translating device or circuit to be supplied with current.

One object of my invention has been to produce a simple, compact, efficient, self-contained switch, with inclosed and protected parts.

The switch consists primarily of two relatively movable members, each carrying a pair of terminals adapted to be brought into contact by relative movement, which movement may conveniently be about an axis midway between equally spaced pairs of such terminals. The circuit connection to such terminals may be by suitable binding posts leading to or forming part of said terminals or extensions thereof and preferably arranged at the rear side of the relatively movable members. In the preferred arrangement which I have found a very convenient one, these terminal connections are so located, and are closed in by suitable caps which may conveniently be ordinary stamped lamp socket coverings, such as may be bought in the open market, though any suitable covering for this purpose may be employed or omitted as desired.

Another object of my invention has been to produce a polarity testing device, capable of being combined with said switch, and yet simple and efficient and of such character that the indications can not be confused or mistaken even by the merest amateur in electrical matters.

So far as concerns its combination and use in connection with the reversing switch, any polarity testing device may be employed, but I prefer one depending for its operation on electro-chemical or electrolytic decomposition to produce the indication, preferably one which gives its indication by a change of color of the electrolytic material and preferably one which operates by cathode reaction to produce a precipitate or solution, preferably of marked or striking color, capable of electro-chemical reversal by change of polarity to cause such coloring matter or solution to disappear from the cathode. In any event, I prefer to arrange matters so that but one electrode is visible and also so that the visible indication shall always be the same for the desired connection. I also prefer to use an absorbent body, such as blotting paper, felt, mineral wool or unglazed pottery saturated with an electrolyte, rather than a body of liquid; this latter may be employed if desired. Such polarity testing device may be arranged for connection in series with the terminals or leads thereto, but in the preferred form, it is arranged in a normally open shunt across said terminals or the leads thereto, and provided with some convenient means for closing the shunt through the testing device at the instant the user desires to test polarity. With such connection, the circuit need not be closed through the translating device or consumption circuit until after the polarity has been determined.

My combined polarity determining and reversing device is particularly adapted for use in charging storage batteries, especially in small plants or units where the supervision is commonly and in many cases, necessarily, in the hands of amateurs, as is the case, for instance, with storage batteries used for electric launches and automobiles, sparking batteries for use in connection with explosive motors on launches, automobiles and elsewhere, and also for minor power purposes such as the running of small motors or operating phonographs or signaling instruments of various kinds, such for instance as my electrical alarm horn used on automobiles, launches, etc. Other uses too numerous to require mention will readily suggest themselves to those familiar with the practical use of electrical appliances of various kinds.

Having described in a general way the characteristics of my combined polarity determining and reversing switch, I will now describe exactly the details of a convenient form in which the various functional features may be conveniently embodied, having reference to the accompanying drawing, wherein—

Figure 2:
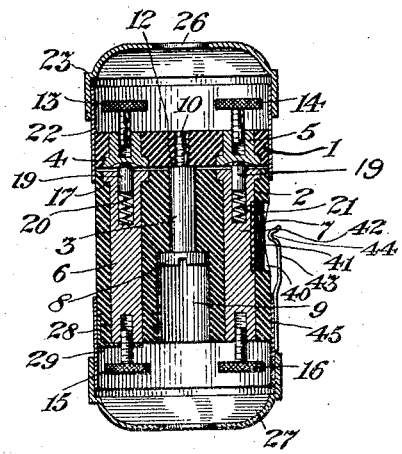
Figure 3:
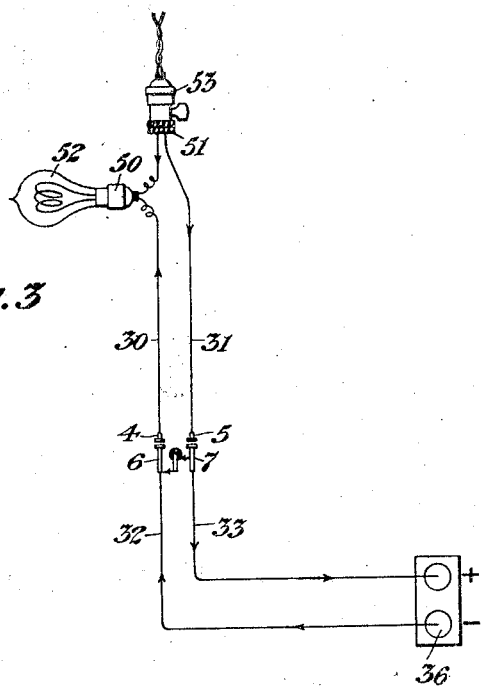

Figure 1 is a side elevation, Fig. 2, an axial or longitudinal section of the device, Fig. 3, a diagrammatic view indicating a desirable arrangement of the device in circuit and connected up for charging a storage battery or similar consumption device, wherein a predetermined particular direction of current flow is functionally desirable or necessary.

Though I show in the drawing and am about to describe in specific form a device which may be followed in every detail in embodying the essentials of the invention in a convenient working form, it will be obvious that the details are merely minor features of the broad invention, and that many of them are subject to ready variation, substitution or omission in manner and form, which will be readily understood by those skilled in the art.

In the drawings, particularly in Figs. 1 and 2 thereof, the device is shown as comprising two axially alined cylindrical members 1 and 2, preferably of insulating material, such as hard rubber or porcelain capable of relative rotary movement about an axially disposed coupling member or swivel screw, 3, and carrying pairs of terminal members 4, 5 and 6, 7 respectively. The member 3, as shown, consists of a screw bolt having a head, 8, adapted to be inserted through the counter-sunk opening, 9, in the rear of the member, 2. It is provided with a smooth shank, adapted to serve as a journal or axis, and a screw threaded reduced portion, 10, adapted to be screwed into the insulating member, 1. The head forms a shoulder or swivel connection and the screw threaded end is preferably reduced so as to leave a right angled annular abutment, 12, which may be secured tightly against the face of 1 to lock the screw against tendency to rotary movement. Any other locking device or nut could be used to serve an equivalent purpose, the arrangement of the parts of 3 being, broadly speaking, merely a convenient swivel connection for the relatively movable members 1, 2. The terminals 4, 5 and 6, 7 are preferably parallel with the axis of the swivel and equidistant therefrom in a diametric plane passing therethrough. I prefer to extend them through to the backside of the insulating members 1, 2 and to there provide suitable circuit connections as by binding screws 13, 14, 15 and 16. The inner contacting portions or members of said contacting terminals are preferably formed with shouldered enlargements as at 17 to resist end thrust resulting from such pressure as is necessary to insure good electrical contact. One or both pairs of terminals may be formed or constructed to insure a good contact across the space between the two members, 1, 2. Thus one pair of said terminals, as for instance 6, 7, may be provided with plungers, 19, preferably rounded at the ends and provided in the rear thereof with springs 20, 21, for forcing them into contact with the mating terminals 4 and 5. The latter are preferably formed with slightly concave ends for semi-positive engagement with the rounded outer ends of the plungers 19. The insulating member, 1, is closed in by a suitable casing which, as previously stated, may conveniently be a covering such as is commonly employed for lamp sockets and preferably consisting of a cylinder 22 and cap 23. This casing is secured together and to the block 1 by suitable screws 24, 25 in such manner that the cylindrical portion 22 laps over and covers the joint between the members 1 and 2, thereby protecting the same from damage, as by dirt, dust, etc. A similar casing, 27, similarly secured, may also be used for the rear end of terminals 6, 7. In the form shown in the drawing, the cylindrical portion of this cap, 27, preferably extends over only a small portion of the length of the member 2. The wires as 30, 31, intended for connection to the supply members, may be secured to the binding posts 13, 14, after the manner of ordinary lamp socket connections, and like them, may be knotted so as to form an enlargement inside of the cap 23, of such size that it will be incapable of passing through the opening, 26, whereby any violent strains on the wires will not be transmitted to the binding post or binding screw connection. The wires 32, 33 leading to the translating device or consumption circuit, may be similarly connected and knotted at the other end of the device.

The device thus constructed constitutes a very simple and efficient form of reversing switch, which may be used in connection with any desired polarity testing instrument or device, or which may be conveniently employed wherever a simple circuit breaker is desirable independently of whether or not it is desired to utilize the reversing function, rotation out of the plane shown in Fig. 2 interrupting the circuit. I have combined with this reversing switch a novel electrolytic testing device arranged and operated in the simplest possible manner both structurally and functionally. 40 is a receptacle, preferably a depressed recess formed in the cylindrical block 2 and preferably located at such a point in the circumference as to cut into the passage for the terminal 7, to make electrical contact therewith. In the bottom of this recess, I prefer to arrange a disk, 41, making electrical contact with 7, and serving as one electrode of the testing device. Outside of this is arranged a layer of absorbent material, such as blotting paper, asbestos or unglazed pottery, adapted to be saturated with any desired sensitive solution. Projecting above the same and adapted to contact therewith, is a movable member, 43, preferably of phosphor-bronze, which may be a leaf spring, provided with an inwardly projecting bend or contact, 44. This spring is secured at 45 to the cylindrical portion of the cap, 27, which forms an electrical connection across to the L-shaped conductor, 28, contacting with said cylindrical portion and bent across the rear side of the insulating member, 2, as at 29. This portion, 29, is held in contact with the terminal 6, in any desired way, as by soldering or simply by the clamping action of the binding screw, 15. As indicated in the diagram of Fig. 3, the disk electrode 41, the electrolyte in the porous body contact, 44, the spring 43, the cap 27, connecting piece 28—29 form a shunt across the terminals 6 and 7, which is normally open but which may be closed for testing purposes.

The electrolyte employed may be phenol phthalin or any other electrolytic chromatically or otherwise changeable substance capable of giving a desired indication, either by cathode or anode re-action. Numbered among these are sympathetic inks having cobalt compounds as a basis. The phenol phthalin solution has some particular advantages in that the solution gives a very marked red indication as a cathode re-action, the liquid itself, being in small quantities, is practically colorless. A solution of this material is also capable of practically complete chemical reversal by reversal of current, so that the color may be made to disappear and the device restored to condition for further operation by reversing the switch for a moment after using.

The above characteristics I take advantage of in the following manner:—I completely cover the anode, 41, with the porous material, 42, taking care that this material be thick enough so that when the connections are made the wrong way, and the normal anode becomes a momentary cathode, the red deposits will be entirely concealed by the porous material and will not, under ordinary conditions, be capable of sufficient diffusion to show through on the visible side of such porous material. The latter is normally white and is preferably marked with the legend "Red means ready", this alliterative instruction being one which the user having once heard can never forget. This feature lends itself very readily to the further elaboration which consists in dyeing or otherwise marking with red, the wire connected at 16, which leads the current to the storage battery or other translating device or consumption circuit. In the case of storage batteries, the positive pole is usually painted red and marked +, so that the amateur has only to connect his red wire to the red pole and turn the reversing switch until he gets the red test at the contact, 44.

While such materials as aluminum and lead are desirable for the anode plate, 41, and phosphor-bronze for the spring contact, any other materials desired may be used and these may be varied to suit the particular electrolyte employed and the chemical re-action which takes place. The principle of selection is that the material of anode and cathode shall not deteriorate rapidly and especially shall not interfere with or prevent the desired test re-action, whereby the color indication is obtained, or the reversal action, whereby the solution is again rendered colorless. It will be obvious that even with phenol phthalin, specifically different results may be obtained by rendering the entire body of electrolyte in the absorbent body, red, in the first instance, and making the test indication to consist of changing the red to the white. It is obvious however that the change from white to red is more positive and practically the more desirable test.

In practice, the automobilist may carry this device with attached wires 30, 31, 32 and 33, and if desired, with socket 50 and plug 51 all connected up and ready for use with any source of charging current. Wherever there is a direct current incandescent lamp within reach, he may unscrew the lamp 52 from its socket 53 and screw it into his socket 50 screwing his plug 51 into lamp socket 53. Thus arranged the lamp will serve as a series resistance to prevent any excessive current flow in his storage battery. He may then twist the two sections of his switch until the plungers 19, 20 indicate contact with the recesses in the electrodes 4, 5. He may then test by depressing spring 42, and, if necessary, again twist the parts to reverse the connection until the proper red test shows on the indicator. He may then connect his red wire, 32, to the red pole, 36, of the storage battery and the wire, 33, to the other pole, in absolute certainty that the direction of charging is as it should be; moreover, if there is any chance of the polarity of the supply current reversing, as might possibly occur in a small private plant in connection with some disorder or break down of the supply circuit or generator, he may test at any moment without interrupting the charging operation. In this situation, the current passes down through wire 31, terminal 5, terminal 7, wire 33, pole of the battery marked +, out through pole marked —, wire 32, terminal 6, terminal 4, wire 30, filament 52 to line. The testing switch may be closed at any time, and if conditions have not changed, the current will flow from terminal 7 to terminal 6, through disk 41, saturated material 42, spring 43, cap 27 and connecting strip 28—29, giving the red test. If the flow has been reversed, the red will not appear.

Any desired adjustable or fixed resistance may be employed in place of lamp 52, or an adjustable resistance may be used in combination with a fixed resistance or a combined fixed minimum resistance may be used in connection with an additional adjustable resistance.

The device may be used as a simple polarity test wherever polarity is of importance, quite independently of its possible use as a charging switch. There are many ways in which this can be done, which will readily suggest themselves. One of the simplest arrangements, where the device is to be used solely for testing purposes, is to remove the cap 23 so that binding posts 13 and 14 are visible. Then, if the spring 43 is stamped with an arrow, 60, and the insulating block, 2, stamped or molded with a line provided with arrow heads, as at 61, under the rule of the legend "Red means ready," the user will understand that the red test indicates current flowing into binding post adjacent to said arrow heads, in the direction indicated by the latter. If the red test does not appear, the switch will be reversed to bring the other binding post adjacent to said arrow line; then, if there is any direct current in the line or device to be tested, the red must show upon depression of 43.

I may make the body 42 a part of the structure and impregnate it from time to time with a fresh supply of liquid electrolyte, or I may impregnate the porous body with a suitable compound and subsequently render it conducting by moistening it with water. This expedient is particularly practicable in the case of blotting paper or asbestos disks. It will be obvious to those skilled in the art that this element of the combination may consist of a disk of electrolytic salt or of a composition containing an admixture of solid electrolyte, which may or may not require moistening.

The concealed contact or electrode, 41, is preferably of ample area as compared with the testing contact, 44, in order that the electrolytic effects may be diffused over the former and concentrated at the latter. Increased thickness of the porous body, 44, facilitates diffusion and small current density over this large electrode, 41, as well as prevents the colored precipitate from diffusing through to the outer surface.

What I claim is:—

1. A device of the character described, comprising members relatively movable about a common axis, said members being provided with suitably insulated switching terminals operated by relative movement about said axis, one of said members carrying a normally open circuit closer, adapted to be connected across said terminals at will, and a polarity testing device in series with and controlled by said circuit closer.

2. A device of the character described, comprising insulating members, mounted for movement about a common axis, in combination with suitable terminal members, adapted to close circuit between said adjacent surfaces, and a polarity indicator, on one of said members.

3. A device of the character described, consisting essentially of blocks of insulating material, in combination with a bolt forming a swivel connection between them, coöperating pairs of contacts on adjacent surfaces of said blocks equidistant from said bolt, independent conducting connections, one for each contact, extending through to the distant ends of their respective blocks and terminating in independent detachable circuit connections together with detachable caps fitted over the ends of said blocks for inclosing and protecting said circuit connections.

4. A device of the character described, comprising a solid body, impregnated with electrolytic material, and means for applying current thereto, comprising a large terminal and a small terminal.

5. A device of the character described, comprising members relatively movable about a common axis, said members being provided with suitably insulated contact making terminals, one of said members carrying a polarity testing device and a circuit controller adapted to close circuit across said terminals and through said polarity testing device.

6. A device of the character described, comprising a cylindrical body consisting of members relatively movable about the axis of said cylinder, conducting terminals extending through said members and adapted to extend across the joint between them, in combination with an electrolytic testing device operatively supported upon the cylindrical side of the larger of said relatively movable members and means for forming a closed circuit connection across said terminals and through said electrolyte.

7. A device of the character described, consisting essentially of blocks of insulating material, in combination with a bolt forming a swivel connection between them, coöperating pairs of contacts on adjacent surfaces of said blocks equidistant from said bolt, the contacts of one of them forming the ends of the conductors from the current supply while the counter contacts form the ends of the conductors to the current consuming apparatus.

8. A device of the character described, consisting essentially of blocks of insulating material, in combination with a bolt forming a swivel connection between them, coöperating pairs of contacts on adjacent surfaces of said blocks equidistant from said bolt, independent conducting connections, one for each contact, extending through to the distant ends of their respective blocks and terminating in independent circuit connections, together with detachable caps fitted over the ends of said blocks for inclosing and protecting said circuit connections.

Signed at New York city in the county of New York and State of New York this 19th day of October A. D. 1905.

MILLER REESE HUTCHISON.

Witnesses:
  G. C. Dean,
  H. G. Stage.